United States Patent [19]

Nozawa et al.

[11] Patent Number: 4,503,373
[45] Date of Patent: Mar. 5, 1985

[54] NUMERICAL CONTROL SYSTEM

[75] Inventors: Ryoichiro Nozawa, Tokyo; Tsuyoshi Nagamine; Hideaki Kawamura, both of Hachioji; Toshiaki Ohtsuki, Hino, all of Japan

[73] Assignee: Fanuc Ltd., Minamitsuru, Japan

[21] Appl. No.: 394,915

[22] PCT Filed: Oct. 29, 1981

[86] PCT No.: PCT/JP81/00314
§ 371 Date: Jun. 18, 1982
§ 102(e) Date: Jun. 18, 1982

[87] PCT Pub. No.: WO82/01600
PCT Pub. Date: May 13, 1982

[30] Foreign Application Priority Data

Oct. 29, 1980 [JP] Japan ................. 55-151579

[51] Int. Cl.³ ............................................ G05B 19/25
[52] U.S. Cl. ..................................... 318/570; 318/600; 364/170; 364/181
[58] Field of Search ............... 318/569, 573, 574, 567, 318/568, 600, 570, 625, 590, 591; 364/167–170, 176, 180–181

[56] References Cited

U.S. PATENT DOCUMENTS 3,633,011  1/1972  Bederman ............... 318/574 X
3,941,985  3/1976  Kawase ..................... 318/569
4,125,798  11/1978 Miller ......................... 318/574

Primary Examiner—J. V. Truhe
Assistant Examiner—Patrick C. Keane
Attorney, Agent, or Firm—Staas & Halsey

[57] ABSTRACT

Ordinarily, an interpolator (102) executes pulse calculations on the basis of a movement command from a command tape (101), to generate the respective distributed pulses XP, YP, ZP, BP and CP of cartesian coordinate axes and spherical coordinate axes, and these pulses drive corresponding servomotors (113)–(117) through servo circuits (108)–(112). In order to keep the relative position between the nose of a tool and a workpiece unchanged in a manual operation, a tool holder is positioned in the cartesian coordinate system, whereupon manual pulses in the B-axial or C-axial direction are generated by a manual pulse generator (103). Then, the distributed pulses BP and CP are generated through the interpolator (102) and rotate the servomotors (116) and (117). The distributed pulses are simultaneously impressed on a compensation circuit (104), which calculates the compensation pulses XHP, YHP and ZHP so as to drive the servomotors with pulses obtained by adding the compensation pulses to the distributed pulses.

2 Claims, 8 Drawing Figures

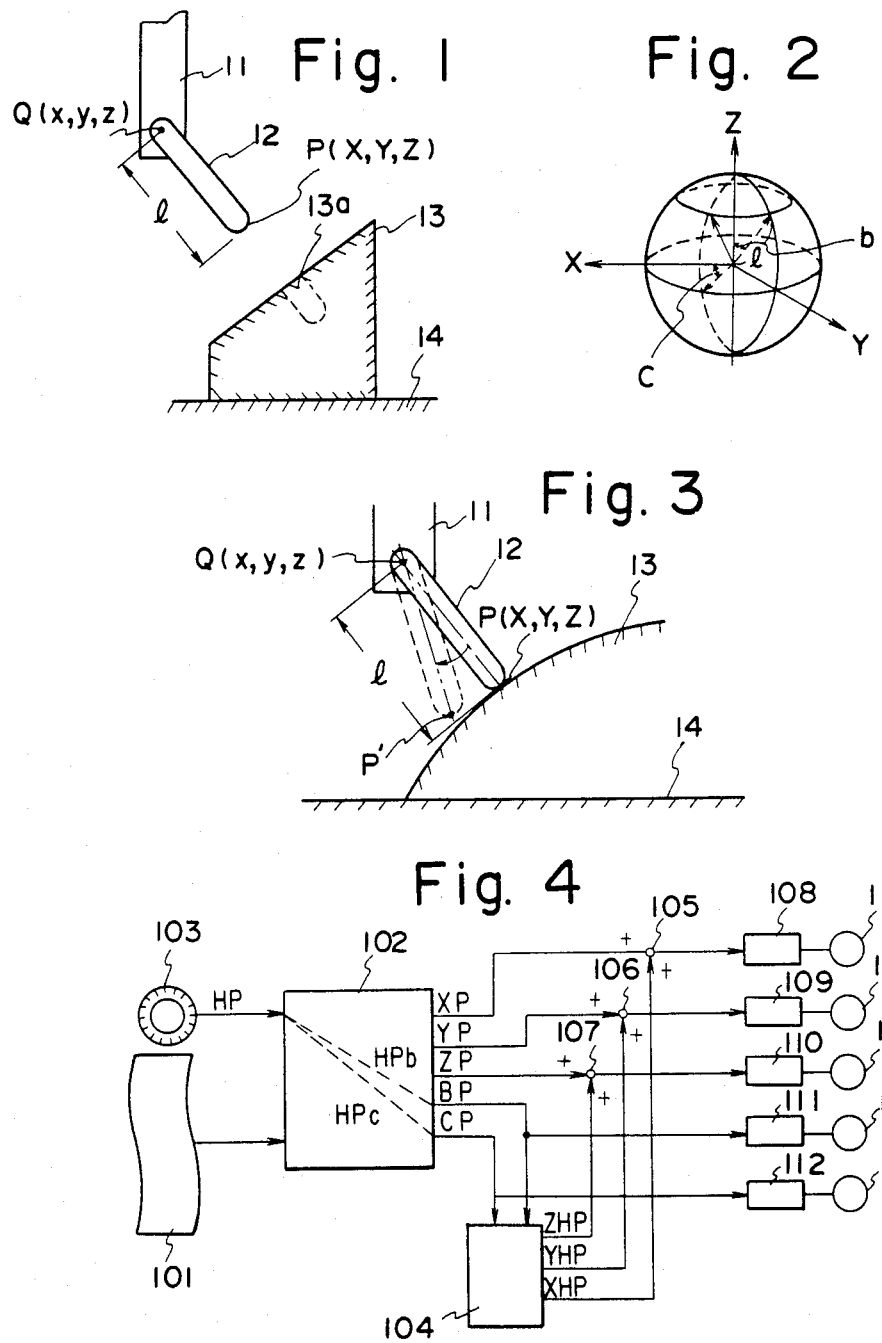

4,503,373

NUMERICAL CONTROL SYSTEM

BACKGROUND OF THE INVENTION

The present invention relates to a numerical control system, and more particularly to a numerical control system which is suitably applied to a numerically controlled machine tool wherein a tool is moved or rotated in the direction of the three X, Y and Z axes (cartesian coordinate system) and the directions of the two of B and C axis (spherical coordinate system) so as to subject a workpiece to three-dimensional machining.

In a machine tool such as a machining center, a tool or a table is rotated in the vertical rotational direction (B-axial direction) and the horizontal rotational direction (C-axial direction) so as to control the tool axis direction of the tool relative to a workpiece or the table, and it is also moved in the directions of the three of X, Y and Z axes so as to subject the workpiece to a desired machining operation.

For example, in forming a hole in the workpiece under 5-axis control, first of all, a tool holder is positioned by moving it in the X-, Y- and Z-axial directions unitarily with the tool, while the tool axis direction of the tool and the direction of the hole to be machined are brought into agreement by rotating the tool in the vertical rotational direction and the horizontal rotational direction. Thereafter, whilst maintaining the tool axis direction, the tool holder is moved toward the workpiece by simultaneous 3-axis control of the X-, Y- and Z-axes. The machining of the hole is started, and the drilling operation is performed down to a predetermined depth. Lastly, the tool is drawn out in the opposite direction to complete the drilling operation. This system has hitherto been proposed.

In a machine tool such as is used in a machining center which conducts machining with the tool inclined relative to the tool holder in this manner, there occurs (1) a case where it is desired to manually change the tool axis direction so as to establish a proper machining condition or so as to sever the interference between the tool and the workpiece in the course of performing the three-dimensional machining by moving the tool in the directions of the three X, Y and Z axes, or (2) a case where it is desired to set the tool relative to the workpiece by manually changing the tool axis direction without changing the relative position between the nose of the tool and the workpiece.

With the prior-art system, however, when the tool is merely rotated in the B- and C-axial directions to change the tool axis direction, the nose of the tool moves, so that the relative positional relation between the nose of the tool and the workpiece changes. In other words, when the tool axis is moved during three-dimensional machining, machining operations as programmed cannot be performed thenceforth on account of the movement of the nose of the tool. Moreover, the manual setting of the tool relative to the workpiece in the prior-art system must conform with the procedure in which the nose of the tool is first located at a predetermined position relative to the workpiece, the tool is subsequently rotated to change the tool axis direction and the nose of the tool is thereafter located again at the point where it lay prior to rotation. The setting operation therefore is very troublesome.

SUMMARY OF THE INVENTION

The present invention has for its object to provide a novel numerical control system in which even when a tool has been rotated in the directions of the B- and C-axes to change the tool axis direction thereof, the relative positional relation between the nose of the tool and a workpiece remains unchanged. To accomplish this and other objects, a case where a tool or a table is rotated in the vertical direction and the horizontal direction so as to control the tool axis direction of the tool relative to a workpiece and where it is also moved in the directions of X-, Y- and Z-axes so as to subject the workpiece to desired three-dimensional machining, variations by which the relative positional relation between the nose of the tool and the workpiece changes due to the rotation are evaluated, and pulse distribution calculations are executed on the basis of the variations so as to move the tool or the table in the X-, Y- and Z-axial directions, thereby to numerically control it so as to maintain the relative positional relation between the nose of the tool and the workpiece which prevailed before rotation.

BRIEF DESCRIPTION OF THE DRAWINGS

FIGS. 1 and 2 are explanatory views for explaining machining under 5-axis control;

FIG. 3 is an explanatory view for explaining a disadvantage of the prior art;

FIG. 4 is a circuit block diagram showing an embodiment of the present invention;

DESCRIPTION OF THE PREFERRED EMBODIMENT

Figure 5:
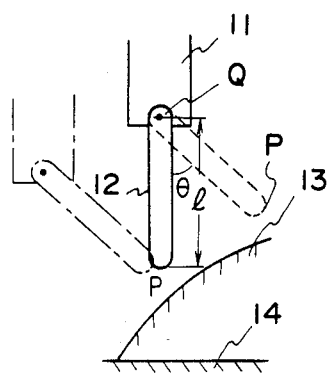
FIG. 5 is an explanatory view for explaining the operation according to the present invention.

The present invention will now be described with reference to the drawings in order to explain it in greater detail.

FIGS. 1 and 2 are explanatory views for explaining 5-axis control in a case where a table and workpiece are fixed and where a tool is moved in the directions of the three X, Y and Z axes (cartesian coordinate system) and in the directions of the two of B and C axes (spherical coordinate system).

In the figures, numeral 11 designates a tool holder which supports a tool in a manner to be rotatable in the directions of the B- and C-axes and which is driven in the three axial directions of the X-, Y- and Z-axes by servomotors (not shown), and numeral 12 the tool, the tool axis of which (dot-and-dash line in the drawing) connecting the nose P (X, Y, Z) of the tool and the center of rotation Q (x, y, z) of the tool is rotated in the B- and C-axial directions. The B-axial and C-axial directions are the vertical and horizontal rotational directions, respectively (FIG. 2), and the spherical coordinate system is formed by a rotational angle b along the B-axis, a rotational angle c along the C-axis and a tool length l. Numeral 13 indicates a workpiece, and numeral 14 a table on which the workpiece 13 is placed.

By way of example, in forming a hole 13a in the workpiece 13 under 5-axis control, first of all, the tool holder 11 is positioned by moving it in the X-, Y- and Z-axial directions unitarily with the tool 12, while the tool axis direction of the tool 12 and the direction of the hole 13a to be machined are brought into agreement by rotating the tool 12 in the B-axial and C-axial directions. Thereafter, whilst maintaining the tool axis direction, the tool holder 11 is moved toward the workpiece 13 by the simultaneous 3-axes control of the X-, Y- and Z-axes, whereupon the machining of the hole 13a is started and the drilling operation is performed down to a predetermined depth. Lastly, the tool is drawn out in the opposite direction to complete the drilling operation.

FIG. 4 is a circuit block diagram of an embodiment for realizing the present invention.

In the figure, numeral 101 indicates a command tape, numeral 102 a well-known interpolator which executes a pulse distribution computation on the basis of a movement command entered from the command tape 101, and numeral 103 a manual pulse generator according to which the rotation of its handle, not shown, over a predetermined angle results in generating a train of pulses HP that has a frequency proportional to the rotational speed of the handle and that has a number of pulses corresponding to the rotational angle. Numeral 104 indicates a compensation circuit, which executes a predetermined computation each time the manual pulses HPb or HPc in the B-axial or C-axial direction are generated, thereby to generate compensation pulses in the X-, Y- and Z-axial directions. Numerals 105, 106 and 107 indicate mixers (or adders), which provide outputs by superimposing distributed pulses XP, YP and ZP for the X-, Y- and Z-axes as generated from the interpolator 102 and the compensation pulses XHP, YHP and ZHP generated from the compensation circuit 104, respectively. Numerals 108–112 indicate servo circuits for the respective axes, and numerals 113–117 driving motors for the respective axes.

The operation of the present invention will now be described.

Ordinarily, the interpolator 102 executes the pulse distribution calculations on the basis of the movement command from the command tape 101, to generate the respective distributed pulses XP, YP, ZP, BP and CP of the X-, Y-, Z-, B- and C-axes and to apply them to the corresponding servo circuits 108–112. When supplied with the distributed pulses, the respective servo circuits drive the motors 113–117 of the corresponding axes by the well-known servo control so as to machine the workpiece as programmed. The B-axial and C-axial driving distribution pulses BP and CP generated during such NC control are applied to the respective servo circuits 111 and 112 and are also applied to the compensation circuit 104 to be reversibly counted in accordance with the rotational direction of the tool and to be stored in current rotational angle position registers, not shown. In other words, the rotational angle $B(t_o)$ in the vertical rotational direction (B-axis) and the rotational angle $C(t_o)$ in the horizontal rotational direction are stored in the current rotational angle position registers.

Referring now to FIGS. 4 and 5, there will be described operations in the case where the tool axis direction is changed by manually rotating the tool through certain angles in the B- and C-axial directions. In FIG. 5, the same parts as in FIG. 1 are assigned the same symbols, and the detailed description thereof will be omitted.

When the tool is manually rotated by $\theta$ in the vertical direction or by $\psi$ in the horizontal direction by operating the manual pulse generator (which may be a jog button or the like) 103, the nose P of the tool moves to P' as shown in FIG. 3. This makes it troublesome to set the tool and does not allow three-dimensional machining as programmed to be carried out. Therefore, those variations $\Delta X$, $\Delta Y$ and $\Delta Z$ in the relative positional relation between the nose P of the tool and the workpiece 13 which are attributed to the rotation of the tool 12 are evaluated, and the tool holder 11, in other words, the center of rotation Q of the tool, is moved by the amount of the variations $\Delta X$, $\Delta Y$ and $\Delta Z$. Then, the relative positional relation between the nose end P and the workpiece 13 is restored. FIG. 5 is an explanatory view useful for describing that, when the center of rotation Q of the tool has been moved by the amount of the variations $\Delta X$, $\Delta Y$ and $\Delta Z$, the relation between the nose P and the workpiece remains unchanged.

Assume now that the tool holder 11 and the tool 12 lie in a rectilinear state (solid-line position in FIG. 5). When the tool 12 is rotated about Q in this state, it shifts to the position indicated by the dotted line. However, when the tool holder 11 is automatically moved to the position indicated by the dot-and-dash line simultaneously with the rotation of the tool or after the completion thereof, the relative positional relation between the tool nose P and the workpiece 13 remains unchanged. In setting the tool 12, it is permissible to automatically move the tool holder 11 by the quantities of variation after the completion of rotation, but it is preferable to move the tool holder simultaneously with the rotation of the tool during three-dimensional machining. The aforementioned $\Delta X$, $\Delta Y$ and $\Delta Z$ are obtained from the following equations:

$$\Delta X = l\{\cos C(t) \cdot \sin B(t) - \cos C(t_0) \cdot \sin B(t_0)\} \tag{1}$$

$$\Delta Y = l\{\sin C(t) \cdot \sin B(t) - \sin C(t_0) \cdot \sin B(t_0)\} \tag{2}$$

$$\Delta Z = -l\{\cos B(t) - \cos B(t_0)\} \tag{3}$$

where l denotes the length from the center of rotation Q of the tool to the nose P of the tool, $B(t_0)$ and $C(t_0)$ the respective rotational angle positions (absolute values) in the B-axial and C-axial directions before the rotation of the tool, and $B(t)$ and $C(t)$ the respective rotational angle positions (absolute values) in the B-axial and C-axial directions after $(t-t_0)$ seconds from start of P rotation.

Discussed will be the reason why $\Delta X$, $\Delta Y$ and $\Delta Z$ can be expressed by Equations (1)–(3).

Now imagine a cartesian coordinate system and a spherical coordinate system the origins of which are the center of rotation Q of the tool 12 as illustrated in FIG. 2, and assume that the tool 12 of radius l is rotation $\theta$ in the B-axial direction and $\psi$ in the C-axial direction. Then, the cartesian coordinate values $(X_0, Y_0, Z_0)$ of the front tool end (i.e., the nose), P can be expressed by the following equations:

$$X_0 = -l \cdot \sin \theta \cdot \cos \psi \tag{4}$$

$$Y_0 = -l \cdot \sin \theta \cdot \sin \psi \tag{5}$$

$$Z_0 = l \cos \theta \tag{6}$$

Equation (6) is the equation of transformation from the spherical coordinate system into the cartesian coordinate system.

Accordingly, letting $\theta_0 = B(t_0)$ and $\psi_0 = C(t_0)$ denote the initial rotational angle positions at the time $t_0$ and $\theta(t) = B(t)$ and $\psi(t) = C(t)$ denote the rotational angle positions after $(t - t_0)$ seconds, the variations $\Delta X'$, $\Delta Y'$ and $\Delta Z'$ of the tool nose P after $(t - t_0)$ in the cartesian coordinate system are obtained from Equations (4), (5) and (6):

$$\Delta X' = -l\{\sin B(t) \cdot \cos C(t) - \sin B(t_0) \cdot \cos C(t_0)\} \quad (1)'$$

$$\Delta Y' = -l\{\sin B(t) \cdot \sin C(t) - \sin B(t_0) \cdot \sin C(t_0)\} \quad (2)'$$

$$\Delta Z' = l\{\cos B(t) - \cos B(t_0)\} \quad (3)'$$

The center of rotation Q of the tool must be moved in the direction opposite to that in which the tool nose P moves then the tool 12 is rotated. By changing the signs of (1)'–(3)', therefore, the variations $\Delta X$, $\Delta Y$ and $\Delta Z$ of Equations (1)–(3) are obtained.

In setting the tool 12, therefore, the tool holder 11 is positioned in the cartesian coordinate system, whereupon the manual pulses HPb and HPc in the B-axial and C-axial directions are generated by the manual pulse generator 103 or the like as shown in FIG. 4. Then, through the interpolator 102, the manual pulses become the distributed pulses BP and CP, which are impressed on the servo circuits 111 and 112 so as to rotate the corresponding servomotors 116 and 117. Thus, the tool 12 is rotated in the B-axial and C-axial directions. In parallel with the above, the distributed pulses BP and CP are applied to the compensation circuit 104. Though not shown, the compensation circuit 104 includes current rotational angle position registers which store the current rotational angle positions B(t) and C(t) in the B- and C-axial directions respectively, registers which store the rotational angle positions $B(t_0)$ and $C(t_0)$ of the tool before the rotation by the manual operation, and an arithmetic circuit which performs the operations of Equations (1)–(3) and which generates the respective compensation pulses XHP, YHP and ZHP in the X-, Y- and Z-axial directions. Accordingly, when the distributed pulses BP and CP are generated, they are reversibly counted relative to the contents of the current rotational angle position registers in accordance with the direction of the rotation, with the result that the current rotational angle positions B(t) and C(t) are stored in the current rotational angle position registers. Meanwhile, the arithmetic circuit contained in the compensation circuit 104 again performs the operations of Equations (1)–(3) at predetermined time intervals and generates the compensation pulses XHP, YHP and ZHP for the X-, Y- and Z-axial directions. These compensation pulses XHP, YHP and ZHP are impressed on the servo circuits 108–110 through the adders (mixers) 105–107 and drive the servomotors 113–115 into rotation. Thus, the tool holder 11 (the center of rotation Q of the tool) moves so that the relative positional relation between the nose tool end P and the workpiece may remain unchanged.

Substantially similar control is performed in a case where, during three-dimensional machining under simultaneous 3-axis control of the X-, Y- and Z-axes, the rotational angle of the tool is manually changed by operating the manual pulse generator or the like, and in a case where the rotational angle of the tool is manually changed in the simultaneous 5-axis control of the X-, Y-, Z-, B- and C-axes.

Figure 6:
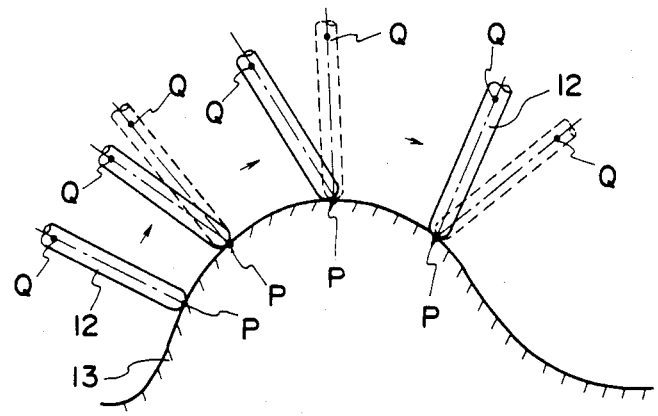
FIG. 6 is an explanatory view for explaining the present invention in simultaneous 5-axis control.

FIG. 6 is a view for explaining such case where the tool axis direction has been manually changed during simultaneous 5-axis control.

In accordance with a machining program punched in the command tape, the tool 12 moves while tracing positions indicated by the dotted lines, and the tool nose P moves on a programmed path. The tool 12 is rotated in the B-axial or C-axial direction by a command from the tape, and its sense is changed every moment.

On the other hand, when the tool 12 is moving on the basis of the machining program, the tool is manually rotated in the B-axial or C-axial direction by operating, for example, the manual pulse generator or the jog button. Then, the tool shifts while tracing positions indicated by solid lines. However, the nose tool end P is controlled so as to move on the programmed path.

Figure 7:
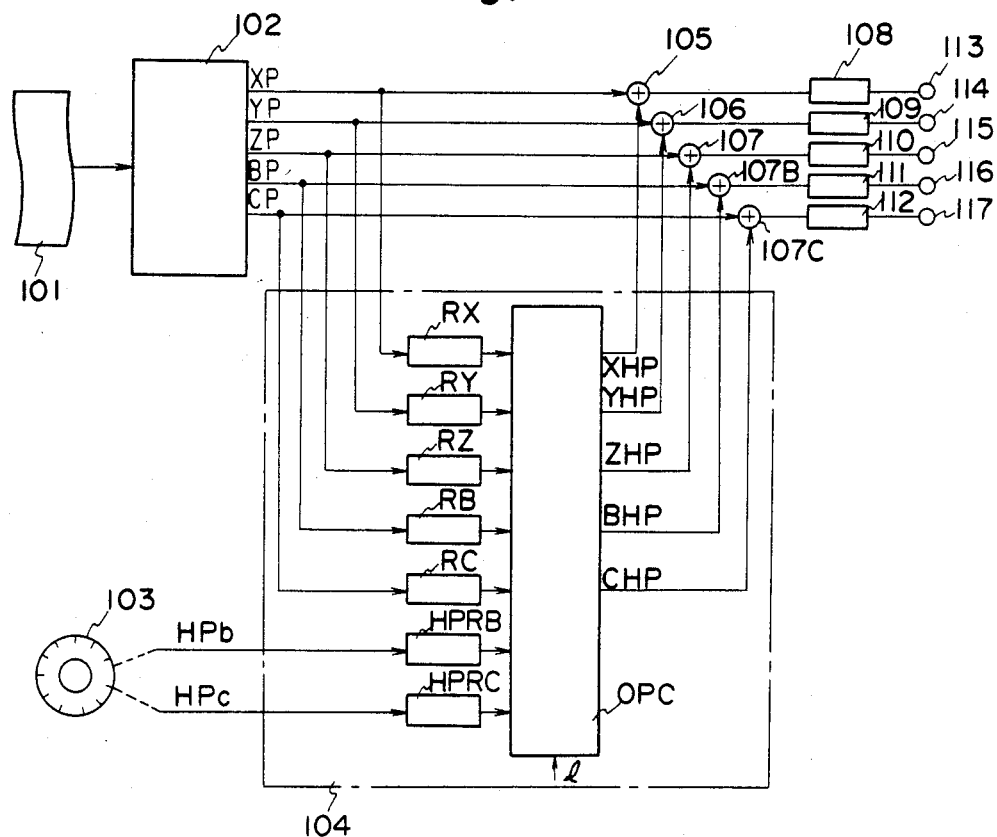
FIG. 7 is a circuit block diagram corresponding to FIG. 6.

FIG. 7 is a block diagram of the circuit of the present invention which causes the nose P of a tool to move on a programmed path in a case where the tool has been manually rotated during simultaneous 5-axis control. The same parts as in FIG. 4 are assigned the same symbols, and they will not be described in detail.

In the figure, numeral 101 indicates a command tape, numeral 102 a well-known interpolator which executes a simultaneous 5-axis pulse distribution computation on the basis of a movement command entered from the command tape 101, and numeral 103 a manual pulse generator which generates manual pulses HPb and HPc in the B-axial and C-axial directions. Which of the pulses HPb and HPc is to be generated by the manual pulse generator, is determined by operating a changeover switch, not shown. Numeral 104 designates a compensation circuit, which includes five registers RX, RY, RZ, RB and RC that reversibly count distributed pulses XP, YP, ZP, BP, and CP in accordance with the moving direction, respectively, and that store the integrated values $X(t_n)$, $Y(t_n)$, $Z(t_n)$, $B(t_n)$ and $C(t_n)$ of the distributed pulses of the respective axes at a time $t_n$, registers HPRB and HPRC that reversibly count the manual pulses HPb and HPc generated by the manual pulse generator, in accordance with the moving direction and the store the integrated values $HPB(t_n)$ and $HPC(t_n)$ of the respective manual pulses in the B-axial and C-axial directions at the time $t_n$, and an operating circuit OPC that executes predetermined calculations upon the generation of the manual pulses HPb and HPc, to generate respective compensation pulses XHP, YHP, ZHP, BHP and CHP in the X-, Y-, Z-, B- and C-axial directions. The operating circuit OPC contains therein registers for storing the integrated values $X(t_{n-1})$, $Y(t_{n-1})$, $Z(t_{n-1})$, $B(t_{n-1})$ and $C(t_{n-1})$ of the distributed pulses in the respective axial directions and the integrated values $HPB(t_{n-1})$ and $HPC(t_{n-1})$ of the handle pulses at a time $t_{n-1}$ a predetermined period earlier than the time $t_n$.

The operating circuit OPC generates the respective compensation pulses XHP, YHP, ZHP, BHP and CHP in the X-, Y-, Z-, B- and C-axial directions by executing at a predetermined time interval the calculations of the following equations where l denotes the length from the center of rotation Q of the tool to the nose P of the tool. $HPX(t_n)$, $HPY(t_n)$ and $HPZ(t_n)$ indicate the integrated values of the respective compensation pulses XHP, YHP and ZHP up to the time $t_n$, these pulses being generated in order that the tool nose may move on the programmed path when the tool has been manually rotated.

$$HPX(t_n)=l\cdot[\cos\{C(t_n)+HPC(t_n)\}\cdot\sin\{B(t_n)+HPB(t_n)\}-\cos\{C(T_n)\}\cdot\sin\{B(T_n)\}] \quad (7)$$

$$HPY(t_n)=l\cdot[\sin\{C(t_n)\}\cdot\sin\{B(t_n)+HPB(t_n)\}-\sin\{C(t_n)\}\cdot\sin\{B(t_n)\}] \quad (8)$$

$$HPZ(t_n)=l\cdot[\cos\{B(t_n)\}-\cos\{B(t_n)\}] \quad (9)$$

Meanwhile, the integrated values $HPX(t_{n-l})$, $HPY(t_{n-l})$, $HPZ(t_{n-l})$, $HPB(t_{n-l})$ and $HPC(t_{n-l})$ of the compensation pulses XHP, YHP and ZHP and manual pulses HPb and HPc at the time $t_{n-l}$ will have been stored in the registers contained in the operating circuit OPC before the operations of Equations (7) through (9) are performed. Therefore, the numbers $\Delta HPJ(t_n)$ (where J: X, Y, Z, B and C) of the compensation pulses of the respective axes at the time $t_n$ are found by performing the operation given by the following equation:

$$\Delta HPj(t_n)=HPJ(t_n)-HPJ(t_{n-l}) \quad (10)$$

Referring back to FIG. 7, symbols 105, 106, 107, 107B and 107C designate adders, which provide outputs by superimposed the distribution pulses XP, YP, ZP, BP and CP of the X, Y and Z axes generated by the interpolator 102 and the corresponding compensation pulses XHP, YHP, ZHP, BHP and CHP generated by the compensation circuit 104. Numerals 108–112 indicate servo circuits for the respective axes, and numerals 113–117 represent driving servomotors corresponding to the respective axes.

The operations of the arrangement shown in FIG. 7 will now be explained.

Ordinarily, the interpolator 102 executes 5-axis simultaneous pulse distribution calculations on the basis of the movement command from the command tape 101, to generate the respective distributed pulses XP, YP, ZP, BP and CP of the X-, Y-, Z-, B- and C-axes and to apply them to the corresponding servo circuits 108–112. Thus, the motors 113–117 of the respective axes are driven in accordance with well-known servo control, to move the tool as programmed (dotted lines in FIG. 6) and to subject the workpiece to predetermined machining. The distributed pulses of the respective axes generated by the interpolator 102 during such NC control are reversibly counted by the respective registers RX, RY, RZ, RB and RC in accordance with the moving direction and then stored therein. Consequently, the integrated values $J(t_n)$ (where J=X, Y, Z, B and C) of the distributed pulses XP, YP, ZP, BP and CP of the respective axes are stored in the corresponding registers RX . . . . . and RC.

When, in the course of controlling the movement of the tool by the command program as described above, the tool is rotated in the B-axial and/or C-axial direction(s) by operating the manual pulse generator 103, the manual pulses HPb and/or HPc are generated. These manual pulses are reversibly counted in accordance with the moving direction by the registers HPRB and HPRC. Consequently, the integrated values $HPB(t_n)$ and $HPC(t_n)$ of the manual pulses HPb and HPc at the time $t_n$ are stored in the registers HPRB and HPRC.

Since the operating circuit OPC is normally performing the calculations of Equations (7)–(10) at predetermined time intervals, the generation of the manual pulses HPb and HPc results in the generation of the compensation pulses XHP, YHP, ZHP, BHP and CHP in the respective X-, Y-, Z-, B- and C-axial directions by means of the compensation circuit 104. The numbers $\Delta HPJ(t_n)$ of the compensation pulses JHP (J: X, Y, Z, B and C) of the respective axes become as follows from Equation (10):

$$HPJ(t_n)-HPJ(t_{n-l})$$

The compensation pulses XHP, YHP, ZHP, BHP and CHP are respectively, applied to the adders 105–107, 107B and 107C and superimposed on the distributed pulses XP, YP, ZP, BP and CP, whereupon the sums are applied to the respective servo circuits 108–112. As a result, the movement of the tool which is driven by the motors of the respective axes is compensated by the components $\Delta HPJ(t_n)$ (J: X, Y, Z, B and C), and the tool nose P moves on the programmed path.

Figure 8:
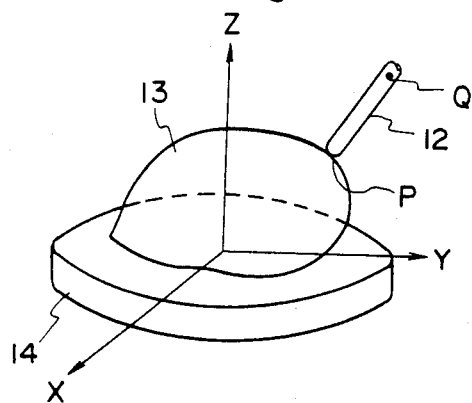
FIG. 8 is a view for explaining a case where a tool and a workpiece are turned.

Although the above description is for the case where the tool is turned in the B-axial and C-axial directions, it may also be turned in the other axial directions or in a uniaxial direction. Further, although a case has been described where only the tool is turned in the B-axial and C-axial directions, the present invention is not limited thereto; the table with the workpiece placed thereon may be rotated instead of the tool. FIG. 8 is an explanatory view of the present invention in the case where the tool 12 is rotated in the B-axial direction and where the table 14 carrying the workpiece 13 thereon is rotated in the C-axial direction.

In order to facilitate the explanation, let it be supposed that the origin of the coordinate system of the workpiece agrees with the center of turning of the C-axis. When the cartesian coordinate values of the center of rotation Q of the tool 12 at the time $t_n$ are $[X(t_n), Y(t_n), Z(t_n)]$, the cartesian coordinate values of the front tool end (nose) P become $[\{X(t_n)-l\cdot\sin B(t_n)\}, Y(t_n)$ and $\{Z(t_n)-l\cdot\cos B(t_n)\}]$, and the integrated values $HPX(t_n)$, $YHP(t_n)$ and $ZHP(t_n)$ of the compensation pulses XHP, YHP and ZHP at the time $t_n$ are correspond to Equations (7)–(9) are given by the following equations:

$$HPX(t_n)=[X(t_n)-l\cdot\sin\{B(t_n)\}]\cdot[1-\cos\{HPC(t_n)\}]+Y(t_n)\cdot\sin\{HPC(t_n)\} \quad (11)$$

$$HPY(t_n)=-[X(t_n)]\cdot\sin\{HPC(t_n)\}+Y(t_n)\cdot[1-\cos\{HPC(t_n)\}] \quad (12)$$

$$HPZ(t_n)=-[l\cdot\cos\{B(t_n)+HPB(t_n)\}-l\cdot\cos\{B(t_n)\}] \quad (13)$$

Accordingly, when Equations (11)–(13) and Equation (10) are used, the compensation pulses can be generated with a construction similar to that shown in FIG. 7.

According to the present invention, in cases where it is desired to manually change a tool axis direction so as to establish a proper machining condition or so as to sever the interference between a tool and a workpiece in the course of performing three-dimensional machining by moving the tool in the three axial directions X, Y and Z in a machine tool such as machining center, and where it is desired to set the tool relative to the workpiece by manually changing the tool axis direction without changing the relative positional relation between the nose of the tool and the workpiece, the desired ends can be attained very simply. Moreover, even when the tool is rotated in the directions of B- and C-axes during three-dimensional machining, the locus of the tool nose can be held as programmed, so that a numerical control system useful in industry can be provided.

What is claimed is:

1. In a numerical control system having a table, and a tool with a tool axis and a center of rotation Q(x, y, z), the tool and the table capable of being rotated in the vertical direction about a B axis and in the horizontal direction about a C axis so as to control the tool axis direction of the tool relative to a workpiece mounted on the table, and the table and tool being capable of movement in the directions of X-, Y- and Z-axes so as to subject the workpiece to desired three-dimensional machining, the numerical control system comprising:

means for manually commanding rotational movement of the tool about the center of rotation Q;

evaluation means for evaluating variations $\Delta X$, $\Delta Y$ and $\Delta Z$ by which the relative positional relation between the nose of the tool and the workpiece changes due to the rotation; and pulse distribution means, repsonsive to said evaluation means, for performing calculations on the basis of said variations to move said tool or said table with respect to each other in the X, Y- and Z-axial directions, so as to maintain the relative positional relation between the nose of said tool and said workpiece as before the manually commanded rotation.

2. A numerical control system as defined in claim 1, characterized in that said variations $\Delta X$, $\Delta Y$ and $\Delta Z$ are set at:

$$\Delta X = l\{\cos C(t) \cdot \sin B(t) - \cos C(t_0) \cdot \sin B(t_0)\},$$

$$\Delta Y = l\{\sin C(t) \cdot \sin B(t) - \sin C(t_0) \cdot \sin (B(t_0)\}, \text{ and}$$

$$\Delta Z = -l\{\cos B(t) - \cos B(t_0)\}$$

(where l denotes the length from the center of rotation of said tool; $B(t_0)$ and $C(t_0)$ the positions of rotational angles in the B-axial and C-axial directions before the manually commanded rotation; and $B(t)$ and $C(t)$ the positions of rotational angles in the B-axial and C-axial directions after t seconds.

* * * * *

UNITED STATES PATENT AND TRADEMARK OFFICE
CERTIFICATE OF CORRECTION

PATENT NO. : 4,503,373

DATED : March 5, 1985

INVENTOR(S) : Nozawa et al.

It is certified that error appears in the above-identified patent and that said Letters Patent is hereby corrected as shown below:

Col. 2, line 9, after "objects" insert --in--.
       line 42, "EMBODIMENT" should be --EMBODIMENTS--;
       line 65, "1" should be -- $\ell$ --.

Col. 4, line 38, "1" should be -- $\ell$ --;
       line 40, "1" should be -- $\ell$ --;
       line 42, "1" should be -- $\ell$ --;
       line 44, "1" should be -- $\ell$ --;
       line 57, "1" should be -- $\ell$ --;
       line 63, "1" should be -- $\ell$ --;
       line 65, "1" should be -- $\ell$ --;
       line 67, "1" should be -- $\ell$ --.

Col. 5, line 61, "nose tool end" should be --tool nose--;

Col. 6, line 17, "nose tool end" should be --tool nose--;
       line 61, "1" should be -- $\ell$ --.

UNITED STATES PATENT AND TRADEMARK OFFICE
CERTIFICATE OF CORRECTION

PATENT NO. : 4,503,373

DATED : March 5, 1985

INVENTOR(S) : Nozawa et al.

It is certified that error appears in the above-identified patent and that said Letters Patent is hereby corrected as shown below:

Col. 7, lines 1-9  FORMULA WRONG should be --

$$HPX(t_n) = \ell \cdot [\cos\{C(t_n) + HPC(t_n)\} \cdot \sin\{B(t_n) + HPB(t_n)\} - \cos\{C(t_n)\} \cdot \sin\{B(t_n)\}] \quad \ldots (7)$$

$$HPY(t_n) = \ell \cdot [\sin\{C(t_n) + HPC(t_n)\} \cdot \sin\{B(t_n) + HPB(t_n)\} - \sin\{C(t_n)\} \cdot \sin\{B(t_n)\}] \quad \ldots (8)$$

$$HPZ(t_n) = \ell \cdot [\cos\{B(t_n) + HPB(t_n)\} - \cos\{B(t_n)\}] \quad \ldots (9) \text{--};$$

line 24, "superimposed" should be --superimposing--.

Col. 8, line 35, "1" should be -- $\ell$ --;
line 36, "1" should be -- $\ell$ --;
line 38, "are" should be --as--;

UNITED STATES PATENT AND TRADEMARK OFFICE
CERTIFICATE OF CORRECTION

PATENT NO. : 4,503,373  Page 3 of 3
DATED : March 5, 1985
INVENTOR(S) : Nozawa et al.

It is certified that error appears in the above-identified patent and that said Letters Patent is hereby corrected as shown below:

Column 8, lines 41-48   FORMULA WRONG
          should be --

$$HPX(t_n) = [X(t_n) - \ell \cdot \sin\{B(t_n)\}] \cdot [1 - \cos\{HPC(t_n)\}]$$
$$+ Y(t_n) \cdot \sin\{HPC(t_n)\} \quad \dots \dots \dots (11)$$

$$HPY(t_n) = -[X(t_n) - \ell \cdot \sin\{B(t_n)\}] \cdot \sin\{HPC(t_n)\}$$
$$+ Y(t_n) \cdot [1 - \cos\{HPC(t_n)\}] \quad \dots \dots \dots (12)$$

$$HPZ(t_n) = -[\ell \cdot \cos\{B(t_n) + HPB(t_n)\} - \ell \cdot \cos\{B(t_n)\}] \dots (13).$$

Col. 10, line 9, "1" should be -- $\ell$ --;
         line 11, "1" should be -- $\ell$ --;
         line 13, "1" should be -- $\ell$ --;
         line 15, "1" should be -- $\ell$ --.

Signed and Sealed this

Fifteenth   Day of   October 1985

[SEAL]

Attest:

DONALD J. QUIGG

Attesting Officer

Commissioner of Patents and
Trademarks—Designate